United States Patent [19]
Farrington et al.

[11] 4,360,508
[45] Nov. 23, 1982

[54] TREATMENT OF EFFLUENTS

[75] Inventors: Frederick Farrington; Peter S. Clough, both of Stretford, England

[73] Assignee: British Gas Corporation, London, England

[21] Appl. No.: 243,036

[22] Filed: Mar. 12, 1981

Related U.S. Application Data

[63] Continuation of Ser. No. 136,988, Apr. 3, 1980, which is a continuation of Ser. No. 949,568, Oct. 10, 1978.

[30] Foreign Application Priority Data

Oct. 13, 1977 [GB] United Kingdom ............... 42647/77

[51] Int. Cl.³ ..................... C01B 17/04; C01B 17/16; C01D 5/02
[52] U.S. Cl. .................................. 423/544; 423/226; 423/551; 423/567 R; 423/573 G
[58] Field of Search ........... 423/226, 227, 544, 567 R, 423/567 A, 573 R, 551, 514

[56] References Cited

U.S. PATENT DOCUMENTS 1,102,911 7/1914 Hansen ................................ 423/551
2,046,880 7/1936 Miller .............................. 423/567 A
3,959,452 5/1976 Espenscheid et al. .............. 423/226

FOREIGN PATENT DOCUMENTS 256638 11/1927 United Kingdom ............... 423/514
394646 9/1931 United Kingdom ............... 423/551

Primary Examiner—Gary P. Straub
Attorney, Agent, or Firm—Larson and Taylor

[57] ABSTRACT

Soluble thiosulphates present in aqueous redox systems comprising at least one salt of an anthraquinone di-sulphonic acid and at least one water soluble compound of metal having at least two stable oxidation states, for example a vanadate, are converted to sulphates by introducing oleum or sulphuric acid into the lower half of a vessel containing said thiosulphate containing redox solution, wherein the sulphuric acid has a concentration of from 10–98% w/w $H_2SO_4$ and the amount of said sulphuric acid is such that the gram molecular weight ratio of sulphuric acid to thiosulphate is from 1:2 to 1:3, and thereafter separating the sulphate formed for example by using a solubility lowering technique. The process is carried out at ambient temperature and at a temperature of from 70° C. up to the boiling temperature of the acidic mixture.

8 Claims, 1 Drawing Figure

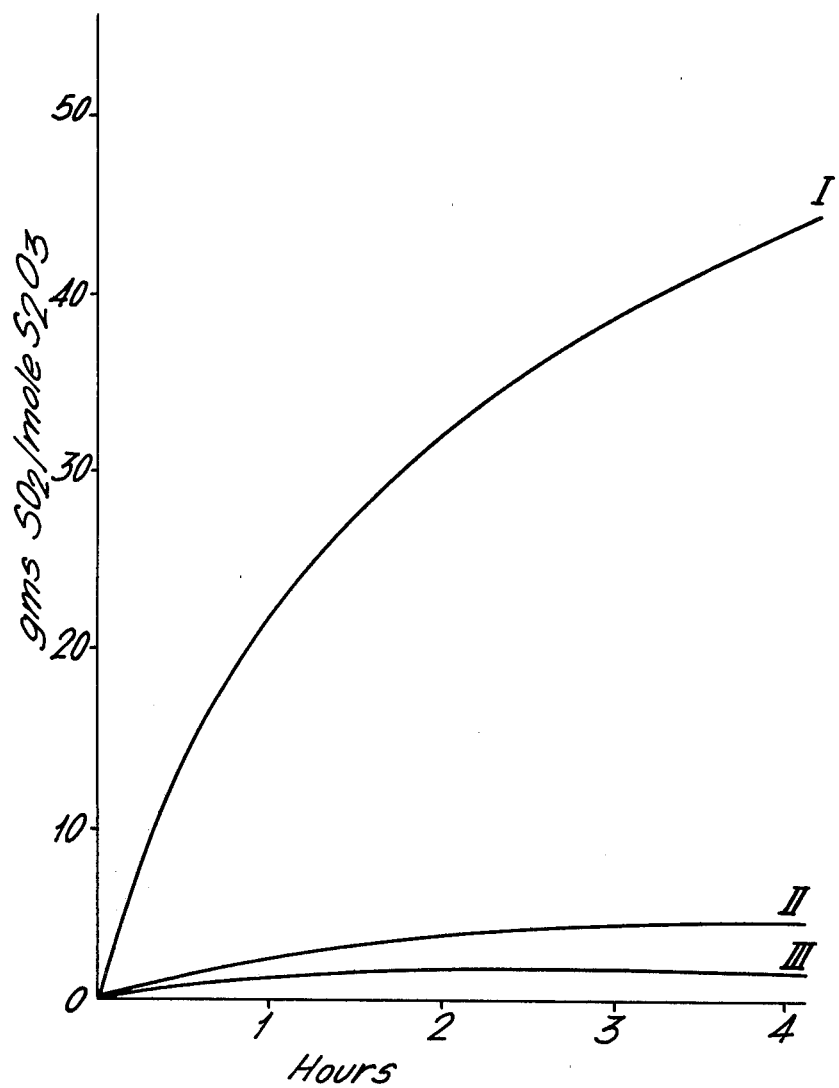

TREATMENT OF EFFLUENTS

This is a continuation of application Ser. No. 136,988, filed Apr. 3, 1980, which is a continuation of Ser. No. 949,568, filed Oct. 10, 1978.

This invention relates to the treatment of aqueous effluents derived from wash liquors employed for the purification of gases and hydrocarbon liquids, by the removal of undesirable contaminants from such effluents. More particularly the invention relates to the removal of solubilised sulphur compounds from wash liquors employed for the removal of hydrogen sulphide from gases and hydrocarbon liquids.

At present there are available several processes for removing $H_2S$ from gases by scrubbing or washing with aqueous reagents and typically the reagents may be redox systems whereby the hydrogen sulphide is solvated and oxidised to elemental sulphur with the concomitant reduction of the reagent. The reagent may be reoxidised and thus regenerated for further use. One such process for $H_2S$ removal using a redox system is known as the Stretford Process and is described in our U.K. Patent Specification No. 948270 wherein the redox system is typically a mixture of anthraquinone disulphonic acid salts and alkali metal vanadates. The reagent system of Stretford Process is reoxidised and regenerated by air-blowing through the reduced liquor. The air-blowing is also employed to remove elemental sulphur from the liquor which is forced during reduction of the reagent. The presence of air and elemental sulphur causes some of the elemental sulphur to be solubilised in the form of sulphoxy compounds such as sulphate and thiosulphate. Solubilisation is also believed to occur at other times during the progress of the Stretford Process cycle. The build-up of these sulphoxy compounds may cause the redox reagents to come out of the solution necessitating the discharge of at least a portion of the liquor to be wasted and, in which case the sulphur compounds, particularly thiosulphates have an undesirable and pollutant effect on the environment owing to their high biological oxygen demand. Current legislation, throughout the world, makes the safe disposal of these liquors a difficult and costly task.

Processes are known whereby thiosulphates may be destroyed by pyrolysis, reduction or hydrolysis. However, the temperatures employed for these processes will also destroy the organic constituents, e.g. anthraquinone disulphonic acid salts and organic sequestrants such as citrates. Thus such processes add a burden to the process economics of the main $H_2S$ removal process in that valuable reagents are lost which have to be replaced.

It has been recognised that thiosulphates may be destroyed by reaction with sulphuric acid. For example, this technique has been described in 'Coke and Chemistry (USSR)' 1963, Volume 8, Pages 42–45 and 1975, Volume 3, Pages 38–40 as well as in Japanese Patent Specification No. 52-1392. However, in these processes sulphur dioxide is produced in significant quantities and this gas is as much a pollutant as the original thiosulphate. The 1975 'Coke and Chemistry' reference discloses a method for reducing sulphur dioxide production by carrying out the thiosulphate acidification reaction at elevated temperature and pressure, e.g. at 165° C. and at a pressure of 6 atmospheres.

The present invention proposes a process for destroying thiosulphates by reaction with sulphuric acid with substantially no sulphur dioxide production and under conditions which avoid the economical burdens proposed by the prior art processes. In accordance with the present invention there is provided a process for the conversion of water soluble thiosulphates to the corresponding sulphates wherein an aqueous solution contaning said thiosulphates is fed to a reaction vessel, reacted with concentrated sulphuric acid and the reaction product comprising a sulphate is removed from the reaction vessel, the improvement consisting in effecting said reaction at about ambient pressure and at a temperature of from about 70° C. to about 100° C. and wherein the sulphuric acid is sparged into the lower and of the vessel containing said aqueous solution.

In carrying out the invention, it has been found essential to contact the sulphuric acid with the liquor at the base of the reaction vessel. This may be achieved by either pumping the acid directly into the bottom of the tank or by introducing the acid from the top directly through a dip tube terminating near the bottom of the vessel. Preferably the contents of the reaction vessel are continuously agitated, e.g. by stirring.

Under the conditions of operation, according to the invention following reactions are believed to take place.

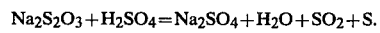

$$Na_2S_2O_3 + H_2SO_4 = Na_2SO_4 + H_2O + SO_2 + S. \qquad I$$

Since the acid is introduced below the main mass of thiosulphate liquor in the reaction vessel, the sulphur dioxide produced in reaction I reacts with thiosulphate Viz $$2Na_2S_2O_3 + SO_2 = 2Na.SO_4 + 3S. \qquad II$$

thereby giving an overall reaction.

$$2Na_2S_2O_3 + H_2SO_4 = 3Na_2SO_4 + 4S + H_2O. \qquad III$$

The process of the invention is particularly advantageous for destroying thiosulphates present in Stretford Liquors. In addition to the benefits afforded by the invention as regards minimizing sulphur dioxide production, the presence of vanadium, inherently present in Stretford Liquors, is also believed to have a catalytic effect in reducing sulphur dioxide formation.

Our investigations have shown that there is some evidence that the vanadium component of the redox liquor will oxidise the sulphur dioxide by promoting the reaction:

$$SO_3{}^{2-} = SO_4{}^{2-} \qquad IV$$

Thus, if the sulphuric acid is contacted with the liquor at the bottom of the reaction vessel, the rising sulphur dioxide reacts with both the vanadium and thiosulphate present in the liqor and no free $SO_2$ is detectable at the top of the vessel. At temperatures below 70° C. little reaction between sulphur dioxide and thiosulphate is oberved even in the case where the gram molecular weight ratio of thiosulphate to sulphuric acid is 3:1.

The concentration of sulphuric acid in total liquor will vary depending upon the temperature at which it is desired to operate the process of the invention. The acid concentration will therefore range from 0.3 to 1.0 gm mole for every gram mole of thiosulphate. However, for reactions carried out at high temperatures it is preferred to provide a slight stoichiometric excess, e.g. 1 gm mole $H_2SO_4$/2 gm mole $S_2O_3{}^2$.

The temperature at which the process is carried out will vary from 70° C. to 100° C., and preferably will be from about 85° C. to 95° C.

The acid strength may vary from above 50% w/w to the most concentrated form available including oleum. However, it is preferred to employ from above 50% to 98% w/w $H_2SO_4$.

The process of the present invention may be carried out at any thiosulphate loading up to the solubility point of the thiosulphate, the solution undergoing reaction having regard to the temperature at which redox wash liquor normally works. For example, a typical Stretford liquor works at about 40° C., at which temperature the solubility of sodium thiosulphate is about 300 gm/liter. However, the Stretford effluent may contain other solubilised sulphoxy compounds. Thus, it is not possible to achieve the theoretical 100% saturation loading of thiosulphate. A Stretford Liquor at 40° C. may be regarded as nearly saturated with sulphoxy compounds when it contains 120 gm/liter $Na_2S_2O_3$ and 100 gm/liter $Na_2SO_4$. Preferably the invention is carried out at the highest loading consistent with maintaining solubility of all the solubilised sulphoxy compounds. It should be emphasised that the relationship of sulphoxy compound loading with temperature is considered for the working temperature of the wash liquor and not necessarily the temperature at which the acidification is effected. Thus for acidification reaction which is carried out at temperatures above 70° C. one still has to consider the sulphoxy compound loading at, say, 40° C.

Upon conversion of the thiosulphate to sulphate in accordance with the process of the invention, the sulphate present in the reaction product may be removed by conventional techniques for lowering its solubility in solutions. For example, the sulphate-containing solution may be cooled to induce crystallisation or the liquor may be heated to evaporate water. The latter technique may be especially useful since the process system already contains appreciable amounts of useful heat. However, since the liquor contains other compounds, e.g. the redox components, the water should not be evaporated off to such a degree whereby the other solution components also come out of solution. Alternatively the sulphate may be rendered insoluble by a precipitation technique such as by the addition of a barium salt or by addition of an organic precipitant such as a lower alkanol, e.g. methanol.

Sodium sulphate is a marketable commodity provided it can be produced in pure form. The glass and detergent industries, for example, utilize pure sodium sulphate in their technologies. One of the disadvantages of removing sulphate directly from the acidification liquor is that the sulphate crystals are likely to be contaminated with elemental sulphur, which is also produced in the acidification process of this invention. There is a problem of the disposal of the acidification liquor, even if the sulphate components are recovered, since the liquor will also contain polythionates which are produced as a side reaction during the acidification step.

Thus, for the removal of sulphate, solubility lowering techniques may be applied to the acidification effluent, or preferably, to a separated side stream.

We therefore propose a process whereby gases or non-polar liquids containing hydrogen sulphide may be purified, whereby sodium sulphate of high quality may be recovered and whereby other sulphoxy compounds which are produced may be destroyed.

This process comprises contacting said gas or non-polar liquid with an aqueous alkaline wash liquor comprising a salt of an anthraquinone disulphuric acid or derivative thereof, and a compound of vanadium, contacting said liquor, after contact with said gas or liquid, with an oxygen containing gas, taking a first portion of said oxygenated liquor, acidifying said portion as described aforesaid, returning said acidified liquor to the remainder of the oxygenated liquor, taking a second portion of said mixed oxygenated and acidified liquor, removing elemental sulphur from said second portion and subjecting said elemental sulphur fee second portion to a solubility lowering technique to induce crystallisation of sodium sulphate, removing said sodium sulphate and returning said second portion, now free of elemental sulphur and sodium sulphate, to the remainder of said oxygenated liquor.

As described aforesaid, the process of the present invention may be employed to increase the overall efficiency of the Stretford Process. Thus, the main purification process may be carried out as described in our U.K. Patent Specification No. 948270 as well as according to our earlier U.K. Patent Specification Nos. 971233 and 878251 and U.S. Pat. Nos. 2,997,439 and 3,035,889, all of which are incorporaated herein by reference.

The aqueous alkaline solution may contain approximately 0.5% by weight of any of the isomeric anthraquinone disulphonic acids (which of course will be present in the form of their salts), and may be initially made alkaline by adding ammonia or an alkali metal carbonate or bicarbonate or other base. It has a pH above 7, the preferred value being from 8.5 to 9.5.

The compound of a metal having at least two valency states may be an ortho-, meta-, or pyrovanadate of ammonia vanadate or sodium orthovanadate. Which ever salt is initially added, it would appear that a meta-vanadate is formed in a solution having a pH of about 9. It is preferably added in such quantity as to give a solution of concentration M/1000 to M/20, although concentrations outside this range may be used.

Other metal compounds which may be used in addition to the vanadates are salts or iron, copper maganese, chromium, nickel and cobalt, for example ferrous sulphate or ferric chloride. Such salts may be used in concentrations of M/1000 to M/100.

Good results are obtainable also by using vanadates together with salts of iron.

It is preferable to add a chelating or sequestering agent for the vanadate. Examples of such agents include soluble tartrate such as sodium potassium tartrate or tartaric acid or ethylene diamine tetracetic acid (referred to hereinafter as EDTA), or citric acid or soluble citrates, present in sufficient quantity to complex at least a portion of the vanadate, in order to maintain the solubility of the vanadate in the presence of hydrosulphide.

In carrying out the process of removal of hydrogen sulphide it appears that absorption of the hydrogen sulphide in alkaline solution occurs with formation of hydrosulphide which is then oxidised. This procedure results in the acceleration of the oxidation process as shown by the following figures relating to the time taken to oxidise 50% of the hydrosulphide in a solution initially containing 340 parts per million of hydrosulphide, using different concentrations of vanadate.

| Anthraquinone Disulphonic Acid | Vanadate | Time for 50% Conversion |
|---|---|---|
| M/100 | Nil | 60 minutes |
| M/100 | M/1000 | 18 minutes |
| M/100 | M/500 | 8 minutes |
| M/100 | M/200 | 2 minutes |
| M/100 | M/100 | 1 minute |

For best results the higher vanadate and/or metal salt concentrations should be used where the hydrosulphide concentration in the alkaline solutions due to the absorption of hydrogen sulphide is higher.

The precipitated sulphur may be removed, e.g. by filtration, either before or after the regeneration of the solution.

After acidification of the portion of oxidised liquor, the portion is returned to the main liquor stream. The portion will contain all the original components of the Stretford liquor, elemental sulphur, sulphuric acid, sulphate and thionates. Although the pH of the portion is acid, when admixed back into the main stream, the overall pH will not drop.

A further portion of this main stream is now taken and subjected to a sulphur removal step. The sulphur present in the stream is solid elemental sulphur suspended in the liquid phase. This sulphur may be removed either by a physical removal technique such as filtration or by chemical techniques to solubilise the sulphur in the aqueous phase of the liquor. The sulphur may be solubilised for example by heating the oxide stream to between 85° C. and boiling. Preferably the solubilising reaction is effected in a delay tank and the residence time may be from 2 to 5 hours. At the end of the solubilising step, all the liquor components are in the aqueous phase. This aqueous phase may then be subjected to a solubility lowering technique, for example as described above. The precipitated sulphate may then be removed for example by filtration and the mother liquor returned to the main process stream. The thionates present in the liquor may be destroyed by contacting the liquor with hydrogen sulphide, i.e. when the liquor is reused for the hydrogen sulphide purification step.

Where the gases or liquid undergoing purification, according to the invention, also contain hydrogen cyanide, we have found that the build up to thiocyanates in the liquor can be controlled by the acidification treatment of the invention in an analogous manner to that for thiosulphates.

By this process, coal and other fuel gases, effluent air streams, liquid hydrocarbons and other materials can be purified so as to be free from hydrogen sulphide, as shown by the following examples.

EXAMPLE I

Two 500 ml aliquots of a Stretford Liquor having a pH of 9 and containing 4 gm/liter of sodium anthraquinone sulphonate, M/32 (as sodium meta vanadate) and 81.9 gm/liter of sodium thiosulphate were each admixed with 8.2 cc of a 25% (w/w) solution of sulphuric acid. The Liquor aliquots and each of the sulphuric acid solutions were preheated to 70° C. and 80° C. respectively prior to admixture.

Each of the acidified solutions were allowed to stand and the thiosulphate contents measured after predetermined periods of time. The results of thiosulphate content reduction with time are shown in Table 1.

TABLE 1

| 70° C. | | 80° C. | |
|---|---|---|---|
| Time (minutes) | g/l $S_2O_3$ | Time (minutes) | g/l $S_2O_3$ |
| 0 | 81.9 | 0 | 81.9 |
| 2 | 79.7 | 3 | 68.3 |
| 8 | 66.7 | 10 | 54.4 |
| 15 | 59.4 | 18 | 45.8 |
| 23 | 53.1 | 26 | 41.7 |
| 31 | 48.1 | 33 | 40.5 |
| 60 | 37.5 | 60 | 39.2 |
| 90 | 38.9 | 75 | 37.0 |
| 135 | 38.3 | | |

EXAMPLE II

To a 500 ml sample of Stretford Liquor having the same composition as that described in Example I, except that the thiosulphate concentration was 248.7 gm/l, was added 55.3 ml of 25% (w/w) sulphuric acid to give a molar ratio of $Na_2S_2O_3:H_2SO_4$ of 2:1. Both the liquor sample and the acid solution was preheated to 93° C. prior to admixture and maintained at 93° C. after admixture. The reaction mixture was analysed for thiosulphate content at predetermined periods of time and the results are shown in Table 2.

TABLE 2

| Time (minutes) | $S_2O_3$ g/l |
|---|---|
| 0 | 248.7 |
| 2 | 139.1 |
| 10 | 59.4 |
| 18 | 59.1 |
| 27 | 57.0 |
| 35 | 53.8 |
| 60 | 45.2 |
| 90 | 34.8 |
| 135 | 23.4 |
| 180 | 16.0 |
| 210 | 14.2 |

At the end of the 3½ hour period the solution was cooled to 1° C. where upon sodium sulphate was observed to crystallise out. The solution was maintained at this temperature until no further crystallisation was observed. The mother liquor was decanted from the solid sulphate residue and filtered to remove suspended sulphate and sulphur. A 25% solution of sodium carbonate solution was added to the filtrate until its pH reached 9 and the pH adjusted solution was qualitatively and quantitatively analysed for anthraquinone disulphonic acid salt and vanadium. The analysis showed that both components were present in the same form and substantially the same amounts at the end of the acidification process as they were at the beginning.

TABLE 3

| | From Filtrate* | From Residue** | |
|---|---|---|---|
| | Time (minutes) | | |
| | 0 | 210 | 210 | % Recovery |
| Vanadium (gm/l) | 1.57 | 1.33 | 0.20 | 97.2 |
| ADA (gm/l) | 3.89 | 3.14 | 0.62 | 96.6 |

*After pH adjustment
**After the residue had been washed with 0% of the recovered pH adjusted filtrate. The filtrate was analysed again and the Vanadium and ADA content from the residue determined by difference.

After the removal of sulphate, the pH of the filtrate was brought back to pH 9 by the addition of 5 mg/l $Na_2CO_3$ and 25 gm/l $NaHCO_3$. The liquor was then loaded with hydrogen sulphide gas to the level of 0.21 gm/l and stood for 25 minutes. The concentrations of sodium tetrathionate present in the liquor prior to H₂S introduction and after the 25 minutes standing period were determined. It was found that the thionate level before H₂S addition was 1.48 gm/l and that the end of the standing period the level had dropped to 0.30 gm/l.

EXAMPLE III

The procedure of Example II was repeated except that after the expiration of the 210 minute acidification step, the liquor was added to about 5 volumes of a Stretford Liquor which had not undergone acidification. The ADA concentration of the mixed solution was 3 gm/l and the suspended elemental sulphur amounted to 1.42 gm/l.

200 ml aliquots of this solution were placed in 1.5×18" test tubes and heated on a water bath. Air was passed into each solution via a sintered bubbler and when it was not passed into the solution, the sulphur was maintained in suspension by an electrically drives glass stirrer.

The results of these experiments are reported in Table 4. In experiments 1-6, air was passed in throughout the experiment (i.e. heating time) at a rate of 50 ml/min. In experiments 7-9 air was blown in for 15 minutes after the expiration of the heating period.

The amount of sulphur solubilised was determined by difference from the original suspended sulphur, by filtering and weighing.

TABLE 4

| Experiment No. | Heating Temp. °C. | Time-Hours | Sulphur Dissolved gm/l | ADA loss % |
|---|---|---|---|---|
| 1 | 60 | 2 | 0.057 | 2.3 |
| 2 | 60 | 4 | 0.084 | 2.8 |
| 3 | 80 | 2 | 0.33 | 0.9 |
| 4 | 80 | 4 | 0.34 | 7.1 |
| 5 | 95 | 1 | 1.27 | 0.9 |
| 6 | 95 | 2 | 1.32 | 1.8 |
| 7 | 80 | 2 | 0.73 | Nil |
| 8 | 80 | 4 | 1.17 | Nil |
| 9 | 95 | 0.8 | 1.32 | Nil |

EXAMPLE IV

This example is presented to demonstrate the effect of vanadium in minimising the evolution of sulphur dioxide under acid conditions.

500 cc of a solution containing 100 gm/l $Na_2S_2O_3$, 4 gm/l ADA and 2 gm/l vanadium was acidified with 16.5 mls. 98% $H_2SO_4$ at 20° C. The molar ratio of sulphuric acid to sodium thiosulphate was 1:1.

The acid was added via a funnel to the bottom of the reaction vessel. The quantity of SO₂ evolved with time was estimated by arranging that the gaseous effluate should pass through a wash bottle wherein any SO₂ was oxidised to the equivalent amount of sulphuric acid by hydrogen peroxide. The sulphuric acid so produced being continuously titrated (to neutrality) with caustics soda. The quantities of caustic soda used were proportioned to the amounts of SO₂ evolved, these quantities expressed as gas evolved per mole of thiosulphate are shown in curve I of the accompanying drawing.

The experiment was repeated at 95° C. using 5.5 mls of 98% sulphuric acid to give a molar ratio of sulphuric acid to sodium thiosulphate of 1:3.

First in the absence of ADA and Vanadium (curve II) and secondly in their presence (curve III). In the third experiment ADA and vanadium were present in the respective molar concentrations M/80 and M/32.

We claim:

1. In a process for the conversion of soluble thiosulphate to sulphates, said thiosulphates being present in an aqueous redox solution comprising at least one salt of an anthraquinone di-sulphonic acid and at least one water soluble vanadium compound, which process comprises introducing sulfuric acid, as such or as oleum, into a deep vessel containing a deep body of said thiosulphate-containing redox solution, the improvement wherein:
 the sulfuric acid introduced has a concentration of from 10–98% w/w $H_2SO_4$;
 the amount of sulfuric acid introduced into said deep vessel is such that the gram molecular weight ratio of sulfuric acid to thiosulphate is from 1:2 to 1:3;
 introducing the sulfuric acid into the base of said vessel and into the bottom of the deep body of said redox solution therein;
 maintaining the contents of said vessel at a temperature of from 70° C. up to the boiling point of the redox solution;
 maintaining said vessel at ambient pressure; and
 thereafter separating the sulphate formed, whereby the generation of SO₂ is not more than 10 grams per mole of thiosulphate present in said aqueous redox solution, and whereby not more than 20% of said thiosulphate remains in said aqueous redox solution after not more than 3½ hours.

2. A process as claimed in claim 1 wherein the said conversion is carried out at a temperature in excess of 90° C. and the molar ratio of sulphuric acid to thiosulphate is about 1:3.

3. A process as claimed in claim 1 wherein the molar ratio of sulphuric acid to thiosulphate is 1:2.

4. A process as claimed in claim 1, wherein the sulpuric acid is 98% w/w.

5. A process as claimed in claim 1 wherein the aqueous redox solution is introduced into said vessel from a main process stream, wherein the redox solution, after treatment with said sulfuric acid, is returned to said main process stream, and wherein said sulphate is removed from said solution prior to returning said solution to said main process stream.

6. A process as claimed in claim 1, wherein the sulphate is separated by a solubility lowering technique.

7. A process as claimed in claim 6, wherein said solubility lowering technique is selected from the group consisting of evaporation crystallisation, refrigerative crystallisation insoluble salt precipitation, organic solvent precipitation.

8. A process as claimed in claim 6 wherein the aqueous redox solution is introduced into said vessel from a main process stream, wherein the redox solution, after treatment with said sulfuric acid, is returned to said main process stream prior to carrying out said solubility lowering technique, wherein a sidestream of said main process stream is provided, and wherein said solubility lowering technique is carried out on said sidestream.

* * * * *